United States Patent [19]

Rasmussen

[11] E Re. 31,129

[45] Reissued Jan. 18, 1983

Best Available Copy

[54] METHOD AND APPARATUS FOR PRODUCING CONTINUOUS SURFACE ELEMENTS

[75] Inventor: Max O. H. Rasmussen, Greve Strand, Denmark

[73] Assignee: Heikki S. Suominen, Tampere, Finland

[21] Appl. No.: 884,775

[22] Filed: Mar. 8, 1978

Related U.S. Patent Documents

Reissue of:

[64] Patent No.: 3,963,549
Issued: Jun. 15, 1976
Appl. No.: 478,958
Filed: Jun. 13, 1974

[51] Int. Cl.[3] ..... B65H 81/00; B29C 17/00

[52] U.S. Cl. ..... 156/193; 156/291

[58] Field of Search ..... 156/198, 184, 197, 193, 156/290–291, 296, 295, 147, 156; 52/2; 5/348; 428/188

[56] References Cited

U.S. PATENT DOCUMENTS

| | | | |
|---|---|---|---|
| 2,388,541 | 11/1945 | Henderson | 156/189 |
| 2,408,789 | 10/1946 | Luisada | 52/2 X |
| 2,748,048 | 5/1956 | Russell | 156/197 X |
| 3,008,862 | 11/1961 | Haine et al. | 156/295 |
| 3,038,525 | 6/1962 | Clark | 156/446 X |
| 3,077,223 | 2/1963 | Hartsell et al. | 156/197 X |
| 3,086,753 | 4/1963 | Cushman | 52/2 X |
| 3,165,820 | 1/1965 | Fromson | 156/197 UX |
| 3,440,130 | 4/1969 | Telkes | 428/188 X |
| 3,513,529 | 5/1970 | Hitchens | 156/197 X |

FOREIGN PATENT DOCUMENTS

| | | | |
|---|---|---|---|
| 120055 | 6/1945 | Australia | 428/188 |
| 209568 | 6/1955 | Australia | 428/1889 |
| 1086541 | 2/1955 | Fed. Rep. of Germany . | |
| 1207070 | 12/1965 | Fed. Rep. of Germany . | |
| 1683194 | 1/1971 | Fed. Rep. of Germany . | |
| 2308715 | 2/1973 | Fed. Rep. of Germany . | |
| 1360988 | 4/1964 | France | 156/197 |
| 1568745 | 5/1969 | France . | |
| 756270 | 9/1956 | United Kingdom . | |
| 1021312 | 3/1966 | United Kingdom . | |
| 1212506 | 11/1970 | United Kingdom . | |

*Primary Examiner*—David A. Simmons
*Attorney, Agent, or Firm*—Pollock, Vande Sande & Priddy

[57] ABSTRACT

A method of and apparatus for producing continuous surface elements, e.g. for so-called air supported shelters, according to which a tubular foil, preferably of plastic material, is wound in several layers between two drums spaced from each other by a distance substantially equaling half the width of the surface element or integral multiples thereof. Immediately prior to winding the tubular foil between the drums, adhesive is applied to the foil so that the outward side of the tubular foil on a preceding winding adheres along a greater or less path to the inward side of the tubular foil in the following winding. After winding a suitable number of loops, in conformity with the desired length of the surface element, the windings are cut mainly perpendicularly with regard to the longitudinal direction of the tubular foil, whereupon the two outer tubular foils in the stack thus obtained are pulled from each other along their whole length, and suitable braces may be introduced into each individual tubular foil section.

6 Claims, 7 Drawing Figures

Figure 1:
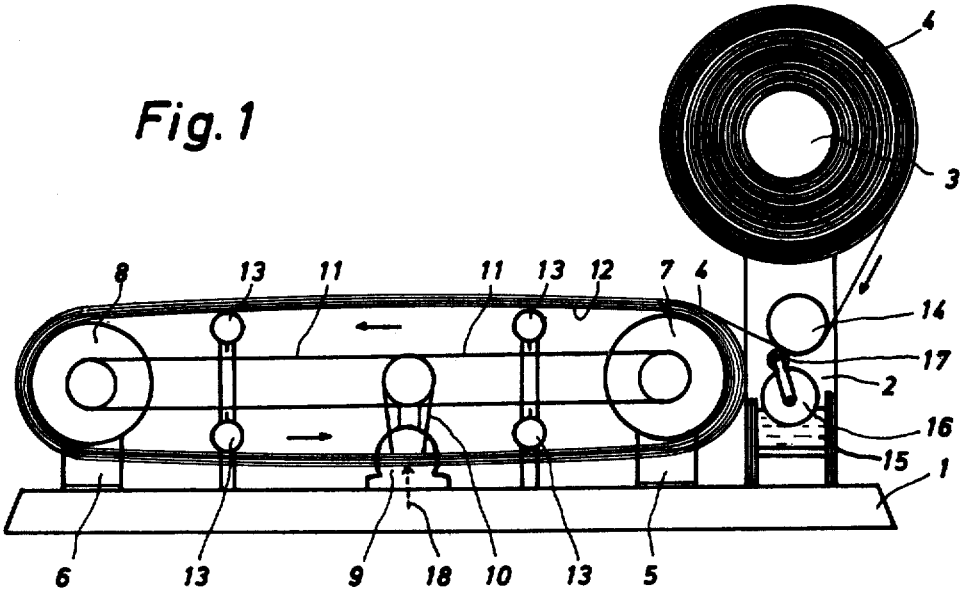

Fig. 3a
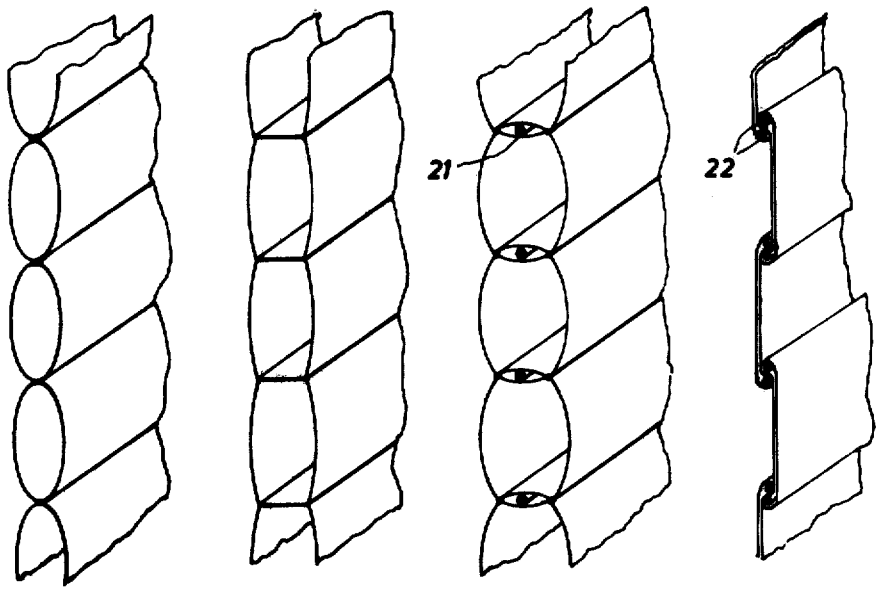
Fig.3b Fig.3c Fig.3d
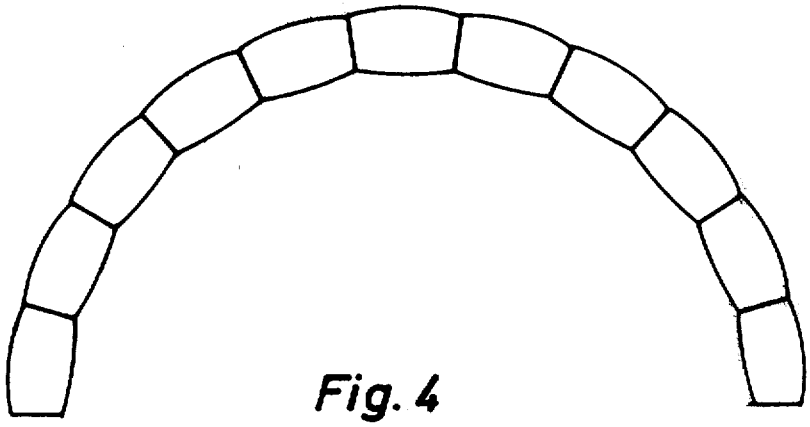
Fig. 4

METHOD AND APPARATUS FOR PRODUCING CONTINUOUS SURFACE ELEMENTS

Matter enclosed in heavy brackets [ ] appears in the original patent but forms no part of this reissue specification; matter printed in italics indicates the additions made by reissue.

The invention relates to a method for producing continuous surface elements for use, for instance in the so-called air supported shelters, consisting of tubular units lying side by side and made of a flexible material. Such surface elements can also be used for other forms of light building constructions, such as greenhouses, garages etc. or parts of such constructions.

Furthermore, the invention relates to an apparatus for utilizing the method.

Air supported shelters are known where the outer stressed surfaces are composed of mainly tubular units of a yielding material, for instance plastic, possibly on a supporting base. By placing these units under controlled overpressure such that the tubular walls are distended they are able to support themselves. It is therefore possible to erect a shelter of this kind without any particular supporting constructions. The edges of the stressed surface are anchored in a foundation and the like.

The tubular units are assembled side by side by adhering to a base of textile or material similar to textile. This is a cumbersome method, because after making the tubular units these have to be cut into the desired lengths and stuck to the base in parallel paths over a rather large breadth corresponding to the length of the shelter.

The object of the present invention is to indicate a method for producing continuous surface elements that can be used for shelters of this kind, but that also can have many other uses. The method according to the invention contains a much simpler production of such surface elements, the units being stuck to each other directly and a base not being necessary.

This is achieved using the method according to the invention, viz. that a tubular foil preferably of plastic is wound in several layers between two driving drums. The distance of these drums from each other is mainly equal to half the breadth of the surface element or to integral multiples of said breadth. Immediately before winding on the drums the adhesive is applied to one of the outer sides of the tubular foil. Thus the outer side of the tubular foil on a preceding winding along a greater or lesser path adheres to the inward side of the tubular foil on the following winding. After a suitable number of windings have been obtained depending upon the desired length of the surface element, the windings are cut along a section mainly perpendicular to the longitudinal direction of the tubular foil. Thereafter the two extreme tubular foils in the stack thus obtained are pulled from each other along their whole length. Furthermore suitable braces can be introduced in each individual section of the tubular foil, if desired.

In this way it is possible in a simple manner to produce continuous tubular foils that can constitute a surface element for various purposes.

According to the invention, the adhesive can be applied to the tubular foil in a narrow strip in the center of the face of the tubular foil. In this way, a surface element with tubular foil sections is obtained, said sections being comparatively lengthy in cross-section.

It can also be appropriate to apply the adhesive in a broader strip in the center of the face of the tubular foil. A surface element is thus obtained that has considerably larger dimensions perpendicularly to the surface element. Thus better heat insulation properties exist than is the case in the aforementioned embodiment. This is true because the air-filled spaced between the outer surfaces of the element is broken by transverse sections of tubular foils which prevent the circulation of air in this space.

This design can also be achieved by applying the adhesive in two narrow strips placed symmetrically on either side of the center line of the foil face. Thus it is possible to introduce braces in the space between two strips.

According to the invention it is also possible to apply the adhesive on the tubular foil asymmetrically in relation to the center line of the face of the tubular foil. Thus there is obtained a surface element that bends around an axis parallel to the longitudinal direction of the tubular foil sections.

The invention also includes an apparatus for utilizing the method. Such apparatus comprises a member for placng a supply coil as well as two driving drums placed apart from each other. An endless supporting belt is placed between the two driving drums. By means of adjustable rollers the belt can be tightly stretched around said drums. The apparatus is equipped with a clamping device for holding the free end of the tubular foil. Furthermore members are placed in the feed path between the supply coil and the drums, for application of an adhesive.

In a special embodiment of the apparatus, the members for applying the adhesive on the tubular foil are adjustable so that they can be brought out of functional relationship. Since adhesive need not be applied on the first winding in order to avoid adhering to the supporting belt, it is appropriate that the application members can be pulled away from the working position.

The distance between the driving drums is mainly equal to half of the desired breadth of the finished surface element or to integral multiples of said breadth. According to the invention, it is appropriate that this distance can be adjusted to various distances, while the belt pulley of the motor can also be adjustable in order that the driving belts be maintained taut.

The invention is further explained with reference to the drawings, where

Figure 2:
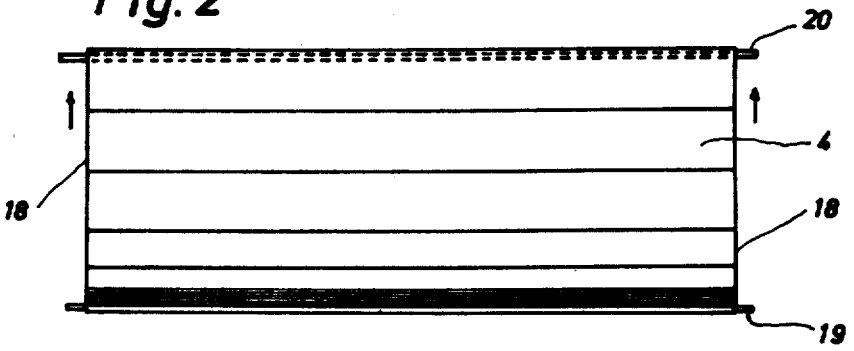

FIG. 1 shows an embodiment of an apparatus for carrying out the method according to the invention, schematically and partly in cross-section, FIG. 2 shows an illustration of the final stage of the method, FIGS. 3a, 3b, 3c and 3d show various embodiments of the surface element, and FIG. 4 another embodiment of the surface element produced following the method according to the invention.

The apparatus in FIG. 1 consists of a base plate 1, upon which the various parts of the apparatus are placed. A support 2 with a supply coil 3 of tubular foil 4 is placed on the base plate. Two supports 5 and 6 with drums 7 and 8 are also placed there. The one support 6 can be displaceably arranged on the base plate 1, so that it can be secured at various distances from the support 5. The drums 7,8 are driven by a common motor 9 by means of V-belts 10 and 11. Between the drums there is placed an endless supporting belt 12 having greater length that can be supported by freely movable rollers 13 appropriately situated up against the inner side of the belt 12 in such a way that the belt 12 is kept tight around the drums 7 and 8. On a bracket on the support 2 a guiding roller 14 is placed under the supply coil 3. A container 15 containing an adhesive is placed underneath the roller 14. The adhesive is applied by means of wheels or rollers 16 and 17 relative to the tubular foil 4 by running over the guiding roller 14.

At the start of the production process the end of the tubular foil 4 is fastened to the supporting belt 12 by means of a clamping device so that and the foil 4 is pulled around. When the end of the tubular foil 4 has been pulled around once the application wheel 17 for the adhesive is placed in working position. Then the adhesive is applied to the tubular foil 4 in a narrow or broader strip, possibly in two narrow strips. Accordingly, the face of the tubular foil successively sticks to the winding lying on the drums. The apparatus then operates and pulls several windings to the drums while adhesive is constantly being applied.

When the required number of layers of tubular foil 4 are wound on the drums 7 and 8 the tubular foil is severed from the supply coil 3 and the layers situated on the drums 7 and 8 are cut through as for instance indicated by the dotted arrow 18.

The continuous layers of tubular foil 4 are removed from the apparatus and laid out on a base with the cut-off edges 18 facing away from each other. A retaining rod 19 is led through the outer tubular foil section on the one side. And lifting rod 20 is led through the outer tubular foil section on the other side. The two rods are then pulled in opposite directions and the surface element is extended to its full length, as shown in FIG. 2.

FIGS. 3a, 3b, 3c and 3d indicate various embodiments of the surface element. In the embodiment of FIG. 3a the parts of the tubular foil are stuck together following a narrow strip, whereas in the embodiment of FIG. 3b they are stuck together over a broader section. FIG. 3c indicates adhesion following two narrow strips. In this embodiment it is possible to insert braces 21 or tubes in the passages formed. In the uses of the surface element shown up to now, the individual tubular foil sections are considered standing under overpressure. The surface element, however, can also be used without this overpressure, as, as shown in FIG. 3d, two braces 22 can be introduced in each tubular foil section. The surface element in this case is the embodiment shown in FIG. 3a with a narrow path of adhesion of the tubular foil sections. By placing the braces so that the tubular foil sections engage in each other as shown, it is possible to obtain a surface element with mainly taut extended tubular foil sections.

When using the surface element for the so-called air supported shelters, the tubular foil sections are placed transversally to the longitudinal direction of the shelter, the cut-off ends 18 being anchored in a foundation and connected to a compressed air unit in a manner known per se. The stack of tubular foil sections stuck together produced by the apparatus in FIG. 1 forms in itself a shape suitable for this purpose.

In the embodiment, of the surface element, the adhesive is applied in the center or symmetrically in relation to the center of the tubular foil led forward from the suppy coil 4. If the adhesive is applied on one side of the center, an embodiment is obtained as shown in FIG. 4, that shows a cross-section of the surface element. If this method is combined with some layers on both sides and the adhesive symmetrical in relation to the center, it is possible in this way to produce a surface element suitable for, car ports as an example. The surface element then only has to be supported at both ends. If a surface element of this kind is made of transparent tubular foil, it can also be used for medium sized greenhouses for use in the garden.

In the apparatus described here only one supply coil 3 is used, the tubular foil sections thus being mainly uniform. However, it is also possible to use two supply coils with a broad and a narrow tubular foil. The narrow tubular foil, for instance, can have a breadth corresponding to the breadth of the path of adhesion in FIG. 3b. In that case an adhesive can be applied to this narrow tubular foil in its full breadth and on both the outer faces, and an embodiment of the surface element as shown in FIG. 3b is thus obtained, however, with a far stronger adhesion.

What I claim is:

1. Method for producing continuous surface elements, for instance for the so-called air supported shelters, and consisting of tubular formed units of flexible material lying side by side characterized in winding tubular foil, preferably of plastic material, in several layers between two drums, the distance between which is mainly equal to multiples of said breadth, applying adhesive to the tubular foil immediately before winding on the drums, such that the outward side of the tubular foil on a preceding winding adheres along a path to the inward side of the tubular foil in the following winding, and cutting the windings, after winding a suitable number of loops depending on the desired length of the surface element, mainly perpendicular to the longitudinal direction of the tubular foil, pulling the two outer tubular foils in the stack thus obtained from each other along their whole length, and furthermore introducing suitable braces in each individual tubular foil section.

2. Method according to claim 1, characterized in applying adhesive to the tubular foil in a narrow strip in the center of the tubular foil face.

3. Method according to claim 1, characterized in applying adhesive to the tubular foil in a wide strip in the center of the tubular foil face.

4. Method according to claim 1, characterized in applying adhesive in two narrow strips at equal distance from the center of the tubular foil face.

5. Method according to claim 1, characterized in applying adhesive to the tubular foil in at least one strip, the path of which is asymmetrical in relation to the center of the tubular foil face.

*6. A method of manufacturing a thermal insulating member from a thin film of material and comprising a pair of spaced opposing generally parallel sidewalls which are bridged by a plurality of spaced transverse walls comprising the steps of:*

*winding a continuous length of a tube formed of the material in its flattened state onto a generally cylindrical member whose circumference corresponds to the desired width of the insulating member, each successive layer of said tube being wound to overlie the immediately preceeding layer to provide thereby a generally cylindrical band of tubular layers extending axially along said cylindrical member a distance corresponding substantially to the flattened width of said tube,*

*adheringly applying the flattened tube during the winding step to the portion of the tube already wound onto the cylindrical member over a band of predetermined*

*width corresponding substantially to the desired width of said spaced transverse walls and thus to the desired spacing between said sidewalls,*

*terminating the winding of the tube onto the cylindrical member when a predetermined number of layers of the tube has been wound thereon corresponding to the desired length of the thermal insulating member,*

*and cutting the superimposed assemblage of successively adhering layers of the tube in a direction transverse to the longitudinal direction of the tube,*

*said assemblage when longitudinally straightened and then extended in a direction transverse to the longitudinal direction of the tube so as to expand the successively joined tubes forming said thermal insulating member.*

* * * * *